United States Patent [19]

Dittmer et al.

[11] Patent Number: 5,100,640

[45] Date of Patent: Mar. 31, 1992

[54] METHOD OF OPERATING A CLAUS-PLANT

[75] Inventors: Rainer Dittmer, Essen; Manfred Gross, Gladbeck; Ulrich Meisl, Essen, all of Fed. Rep. of Germany

[73] Assignee: Krupp Koppers GmbH, Essen, Fed. Rep. of Germany

[21] Appl. No.: 635,473

[22] Filed: Dec. 28, 1990

Related U.S. Application Data

[63] Continuation-in-part of Ser. No. 431,920, Nov. 6, 1989.

[30] Foreign Application Priority Data

Dec. 22, 1988 [DE] Fed. Rep. of Germany ....... 3843295

[51] Int. Cl.⁵ .............................................. C01B 17/04
[52] U.S. Cl. ............................................... 423/574 R
[58] Field of Search ...................... 423/574 R, DIG. 9

[56] References Cited

U.S. PATENT DOCUMENTS 3,877,879 4/1975 Palm et al. ................. 423/574 R

FOREIGN PATENT DOCUMENTS 2107450 4/1983 United Kingdom .

Primary Examiner—Wayne Langel
Attorney, Agent, or Firm—Michael J. Striker

[57] ABSTRACT

The method of performing the Claus process includes the steps of connecting in parallel two combustion furnaces with waste heat boilers, further reacting, after the partial combusting in the combusion furnaces, in a single Claus reactor which is connected to both of the waste heat boilers of the combustion furnaces so as to receive partially combusted gas from the combustion furnaces, and partially combusting the reactant gas in only one of the combustion furnaces, when a hydrogen sulfide mass flow rate of the hydrogen sulfide fed with the reactant gas is below a certain threshold, and partially combusting of the reactant gas in both of the combustion furnaces, when the hydrogen sulfide mass flow rate of the hydrogen sulfide is greater than the threshold value. The production capacity of the single Claus reactor is designed for a maximum expected hydrogen sulfide mass flow rate in the inflowing reactant gas. The fluctuations or variations of the hydrogen sulfide mass flow rates in the reactant gas can be handles, while minimizing investment and operating costs. Savings of 10 to 15% inoperating and investment costs can result from using this Claus-plant operating process.

1 Claim, 1 Drawing Sheet

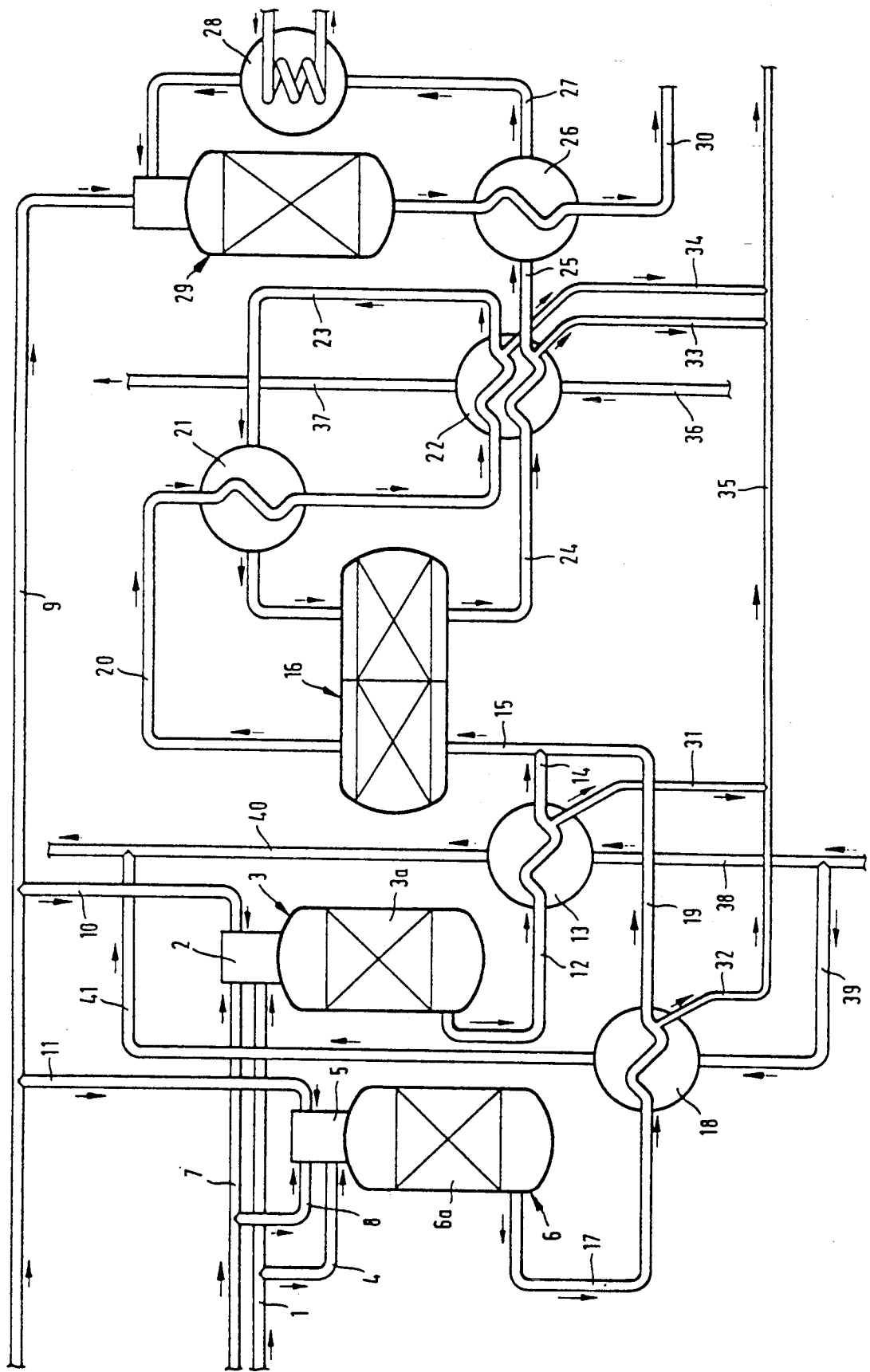

METHOD OF OPERATING A CLAUS-PLANT

This application is a continuation-in-part of application Ser. No. 07/431,920, filed Nov. 6, 1989, abandoned.

BACKGROUND OF THE INVENTION

Our invention relates to a method of operating a Claus-plant.

A process or method of operating a Claus-plant is known, in which an H$_2$S-containing input or reactant gas is first subjected to a partial combustion and after that is further reacted in a two or multistage Claus-reactor.

On performing the so-called Claus process the H$_2$S-containing reactant gas is first subjected to a partial combustion in a combustion furnace under such conditions that only a third of the hydrogen sulfide contained in the reactant gas is burned according to the following chemical reaction (I):

$$H_2S + 1.5\ O_2 \rightarrow SO_2 + H_2O \qquad (I)$$

In the combustion furnace a special catalytic layer can be installed, which acts to destroy the nitrogen compounds found in the reactant gas.

Subsequently the hot gas is cooled in a waste-heat boiler and after that fed into a two or multistage Claus reactor, in which the further reaction of the gas occurs in the presence of a catalyst according to the following chemical reaction (II):

$$2\ H_2S + SO_2 \rightarrow 3\ S + 2\ H_2O \qquad (II)$$

In the usual Claus-plant the combustion furnace with waste-heat boiler for partial combustion of reactant gas, the Claus reactor with associated devices and the sulfur precipitator are connected in series. The dimensions of this plant thus depend on the expected H$_2$S-content of the starting gas and the normal starting gas flow rate to be processed so that the capacity of the sulfur production in the plant is as a whole limited. Variations of the predetermined production capacity are possible only in a narrow limited range. In so far as increasing amounts of H$_2$S in the starting gas and starting gas flow rates were factored into the art, one attempted to solve these problems up to now by building two-or multistage Claus-plants. That means however an increased expense in plant operating and building costs, since in this case all plant units of the whole plant must be present as dual or multiple components and moreover in case of reduced sulfur production the unused plant components must be maintained in a heated condition, since during sudden increases of the required production capacity they must be operated continuously.

SUMMARY OF THE INVENTION

It is an object of the present invention to improve the method of operating a Claus-plant so that in case of variations from the currently-required production capacity a saving in investment and operating costs can be attained.

According to the present invention the method of performing the Claus process comprises the steps of connecting in parallel two combustion furnaces with waste heat boilers, further reacting, after the partial combusting in the combustion furnaces, in a single Claus reactor which is connected to both of the waste heat boilers of the combustion furnaces so as to receive partially combusted gas from the combustion furnaces, and partially combusting the reactant gas in only one of the combustion furnaces, when a hydrogen sulfide mass flow rate of the hydrogen sulfide fed with the reactant gas is below a certain threshold, and partially combusting of the reactant gas in both of the combustion furnaces, when the hydrogen sulfide mass flow rate of the hydrogen sulfide is greater than the threshold value. The production capacity of the single Claus reactor is designed for a maximum expected hydrogen sulfide mass flow rate in the inflowing reactant gas. The fluctuations or variations of the hydrogen sulfide mass flow rates in the reactant gas can be handled, while minimizing investment and operating costs.

That means that two or more than two complete Claus-plants connected in parallel are no longer required. However the improved process of the invention described in the above paragraph still includes only two combustion furnaces with associated waste-heat boilers. If the plant is fed a reactant gas so that a comparatively low hydrogen sulfide mass flow rate is provided, the partial combustion of gases occurs only in one combustion furnace. If the input hydrogen sulfide mass flow rate in contrast is comparatively large, the partial combustion of gases occurs in both combustion furnaces. Only a single Claus reactor with associated equipment is provided for gas treatment, which is designed for a maximum expected hydrogen sulfide mass flow.

BRIEF DESCRIPTION OF THE DRAWING

The objects, features and advantages of the present invention will now be illustrated in more detail by the following detailed description, reference being made to the accompanying drawing in which:

The sole FIGURE is a flow chart of one example of a process performed in a Claus plant using the method for operating a Claus plant according to the invention.

DETAILED DESCRIPTION OF THE INVENTION

The reactant gas to be treated is fed by pipe 1 into the burner 2 of the combustion furnace 3. If the hydrogen sulfide mass flow rate is greater than the predetermined capacity of the combustion furnace 3, a partial flow of the reactant gas is branched from the pipe 1 and conducted through the pipe 4 into the burner 5 of the second combustion furnace 6. The required combustion air is fed to the burners 2 and 5 over the pipes 7 and/or 8, while the pipes 10 and 11 branch off from the pipe 9 providing the necessary supply of hot gas, e.g. coke over gas or partially oxidized gas, to the burners 2 and 5. A catalytic layer 3a is provided in combustion furnace 3 and another catalytic layer 6a is provided in combustion furnace 6. These catalytic layers 3a and 6a facilitate decomposition of the nitrogen compounds present in the reactant gas. After passing through the combustion furnace 3 the hot gas reaches the waste-heat boiler 13 via the pipe 12, in which it is cooled to a temperature of 270° C. so that it can be subsequently conducted via the pipe 14 into the collection pipe 15, through which the gas is supplied to the first stage of the Claus-reactor 16. In as much as the second combustion furnace 6 is similarly operated, the partial flow of gas treated there is drawn through the pipe 17, into the associated waste-heat boiler 18, suitably cooled there and after that fed over the pipe 19 similarly into the collection pipe 15 so that both partial flows of gas are jointly fed to the Claus-reactor 16. From the first stage of the Claus reactor 16 the gas is withdrawn via the pipe 20 and arrives in the first part of the waste-heat boiler 22 after passing through the heat exchanger 21, in which it is cooled until it reaches a temperature of 154° C. After that the gas is conducted via the pipe 23 into the second stage of the Claus-reactor 16. In the heat exchanger 21 connected therebetween it experiences a certain heat up. From the second stage of the Claus-reactor 16 the gas issues through the pipe 24 and is fed to the second portion of the waste-heat boiler 22, in which it is cooled down to a temperature of 154° C. The major portion of the sulfur is removed from the gas downstream of the waste-heat boiler 22. This gas, which is many times referred to as Claus-residual gas, still has a small quantity of unreacted $H_2S$ and $SO_2$. Because of these impurities this residual gas cannot be discharged into the atmosphere. It is next conducted over the pipe 25 into the heat exchanger 26 and then arrives in the hydrogenation reactor 29 via connecting pipe 27. It experiences a heat up to about 280° C. in the heater 28 connected between heat exchanger 26 and hydrogenation reactor 29. The hot gas, which is supplied to the hydrogenation reactor 29 over the pipe 9, serves as hydrogen carrier for the hydrogenation. The hydrogenation residual gas is drawn over the pipe 30 from the hydrogenation reactor 29. Since this residual gas, as has already been said, still contains some $H_2S$ as the sulfur component, it can be further treated by a $H_2S$-wash. In as much as the Claus-plant is operated in connection with a coal gasification or coal gasification-coking unit, the residual gas can be mixed with the crude gas produced there prior to the $H_2S$ wash.

The sulfur deposited in the waste-heat boilers 13, 18 and 22 on cooling of the gas is drawn through the pipes 31, 32, 33 and 34, which all open into the collection pipe 35, through which the sulfur is fed for further processing. The conduit 36 serves to conduct boiler feed water to the waste-heat boiler 22, while the steam produced there is drawn through the pipe 37. The waste-heat boiler 13 is provided with the required boiler supply water via the conduit 38. A pipe 39 branches from this conduit 38 through which the boiler feed water feed to the waste-heat boiler 18 occurs. The steam produced in the waste-heat boilers 13 and 18 is drawn through the pipes 40 and 41, where the steam from the pipe 41 is combined with the steam from the pipe 40.

The plant components used to perform the previously described process are already known and familiar in the prior art. The combustion furnace and the Claus-reactor works with the usual conditions and catalysts for performing a Claus-process. Since the process conditions as is the case for the structural features of the individual components are not the subject matter of the present invention, it is not necessary to describe them in detail.

This example concerns the treatment of a reactant gas, which originates from the $H_2S$ wash of a partially oxidized crude gas obtained during coal gasification, which after suitable gas treatment is used as combustion gas in operation of a subsequently connected gas and steam turbine power plant. Since on the one hand the sulfur content of the coal used in the gasification can fluctuate between 0.5 and 3.0 % and on the other hand the power plant should be operated with a capacity load of between 40 and 110 %, in this case the $H_2S$ mass flow rate fed to the Claus-reactor with the reactant gas is subjected to considerable variations, which make the use of the process of this present invention a necessity. Presuming that the Claus-reactor is designed for a maximum production capacity of about 200 kg sulfur/hour sulfur per hour, a saving in investment and operating costs in the range of about 10 to 15 % results by the use of the process according to our invention in contrast to use of a dual path Claus-plant.

While the invention has been illustrated and described as embodied in a method of operating a Claus-plant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

What is claimed is:

1. In a method of performing a Claus process in a Claus-plant having at least one Claus-reactor, said Claus process comprising the steps of partially combusting an $H_2S$-containing reactant gas in at least one combustion furnace with waste heat boiler connected in series to the at least one combustion furnace and, after said partially combusting, further reacting said gas in said at least one Claus-reactor, each of said combustion furnaces having a predetermined capacity for burning hydrogen sulfide, the improvement comprising the steps of connecting in parallel two of said combustion furnaces with waste heat boilers, performing said further reacting, after said partial combusting in said combustion furnaces connected in parallel, in a single one of said Claus reactors, said Claus reactor having a production capacity designed for a sulfur mass flow resulting from operation of both of said combustion furnaces at said predetermined capacities and said Claus reactor being connected to both of said combustion furnaces, and performing said partially combusting of said reactant gas in only one of said combustion furnaces so connected in parallel, when a hydrogen sulfide mass flow rate of said hydrogen sulfide fed with said reactant gas is below a certain threshold corresponding to the predetermined capacity of said combustion furnace, and performing said partially combusting of said reactant gas in both of said combustion furnaces so connected in parallel, when said hydrogen sulfide mass flow rate of said hydrogen sulfide is greater than said certain threshold to provide a saving of investment and operating costs, said method including fluctuations or variations of the hydrogen sulfide mass flow rate in the reactant gas above and below said certain threshold.

* * * * *